United States Patent
Koyama et al.

(10) Patent No.: US 7,679,847 B2
(45) Date of Patent: Mar. 16, 2010

(54) LENS-BARREL AND IMAGE PICKUP APPARATUS

(75) Inventors: Takashi Koyama, Tokyo (JP); Masaaki Kamoda, Saitama (JP)

(73) Assignees: Sony Corporation, Tokyo (JP); Tamron Co., Ltd., Saitama (JP)

( * ) Notice: Subject to any disclaimer, the term of this patent is extended or adjusted under 35 U.S.C. 154(b) by 105 days.

(21) Appl. No.: 11/659,961

(22) PCT Filed: Jun. 13, 2006

(86) PCT No.: PCT/JP2006/311819

§ 371 (c)(1), (2), (4) Date: Jun. 6, 2007

(87) PCT Pub. No.: WO2006/134907

PCT Pub. Date: Dec. 21, 2006

(65) Prior Publication Data

US 2007/0291380 A1 Dec. 20, 2007

(30) Foreign Application Priority Data

Jun. 13, 2005 (JP) .............................. 2005-172180

(51) Int. Cl.
G02B 7/02 (2006.01)
G02B 15/14 (2006.01)

(52) U.S. Cl. ........................ 359/823; 359/819; 359/703; 359/694

(58) Field of Classification Search ......... 359/399–435, 359/811–830, 836, 699–700, 703–704, 694–697
See application file for complete search history.

(56) References Cited

FOREIGN PATENT DOCUMENTS

| JP | 56-145231 | | 11/1981 |
|---|---|---|---|
| JP | 08-122610 | | 5/1996 |
| JP | 11-150972 | | 6/1999 |
| JP | 11-337806 | | 12/1999 |
| JP | 2000330154 A | * | 11/2000 |
| JP | 2001-318292 | | 11/2001 |
| JP | 2004-170688 | | 6/2004 |
| JP | 2005005635 A | * | 1/2005 |

OTHER PUBLICATIONS

International Search Report, Jul. 25, 2006.
Japanese Office Action issued Mar. 26, 2009 for corresponding Japanese Application No. 2005-172180.

* cited by examiner

*Primary Examiner*—Darryl J Collins
*Assistant Examiner*—Zachary Wilkes
(74) *Attorney, Agent, or Firm*—Rader, Fishman & Grauer PLLC

(57) ABSTRACT

A lens barrel and an image pickup apparatus include a flow path (70) that is provided at a position (A) where a first fixed lens frame (22) faces a movable lens frame (32) and a position (B) where the movable lens frame (32) faced the first fixed lens frame (22) as that air flow resistance can be generated when the air is released which is present between the first and second lens frames if these lens frames get close to each other. The flow path (70) is provided so that the air present between a fixed lens (20) and a movable lens (30) may also be passed through the flow paths when the first fixed lens frame (22) and the movable lens frame (32) get close to each other.

11 Claims, 14 Drawing Sheets

LENS-BARREL AND IMAGE PICKUP APPARATUS

TECHNICAL FIELD

Figure 1:
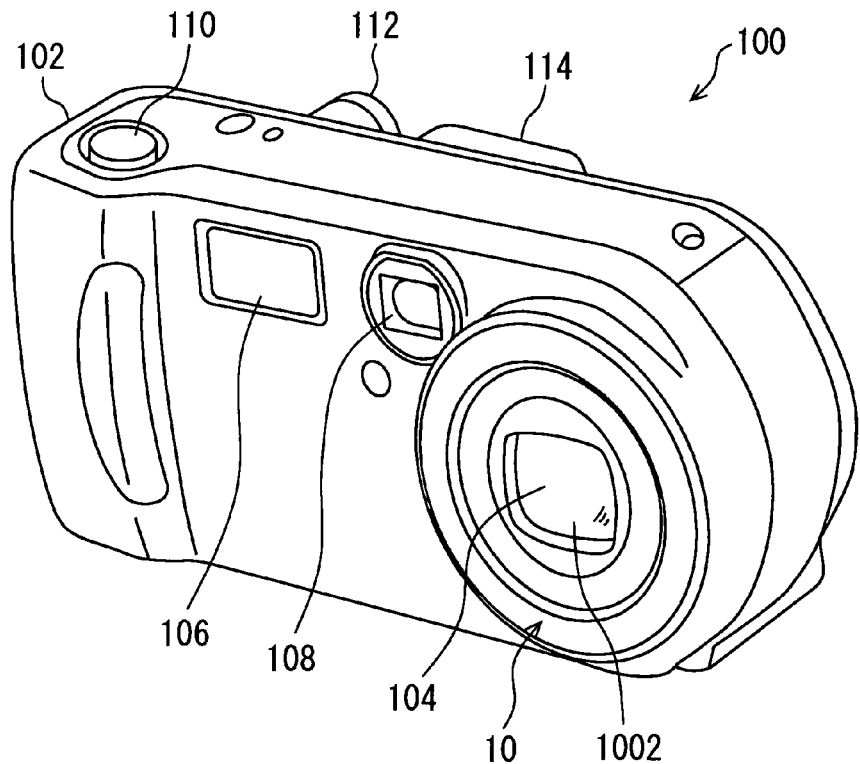

The present invention relates to a lens-barrel and an image pickup apparatus.

BACKGROUND ART

An image pickup apparatus such as a digital still camera or a digital video camera is equipped with a lens-barrel.

Such a lens-barrel has, on a position of a front of image pickup device for picking up an image of a subject, a lens that directs the image of subject toward the image pickup device, a lens frame that holds the lens and is provided as to be movable along a guide shaft extending along an optical axis of this lens, and a drive mechanism for moving the lens frame along the optical axis, in such a configuration that these lens, lens frame, and drive mechanism are arranged in the lens-barrel.

As such a drive mechanism, a lens-barrel employing a linear motor has been proposed (see Japanese Patent Application Publication No. Hei 11-150972).

That is, in this lens-barrel, a magnetic circuit configured by a magnet and a yoke is equipped to a barrel as a fixed part, and a coil is equipped to a lens frame as a movable part, in which passing an electric current through the coil allows to be generated magnetic interaction between the coil and the magnetic circuit, thereby enabling the lens frame to be moved along an optical axis.

DISCLOSURE OF THE INVENTION

In this conventional lens-barrel, if supply of an electric current to the coil is stopped, the magnetic interaction acting on the coil and the magnetic circuit disappears, thereby permitting the lens frame to move freely along a guide axis.

Therefore, if a user rocks the image pickup apparatus in his or her hand or rapidly changes a posture of the image pickup apparatus, the lens frame may collide with any other lens frame adjacent thereto to produce hitting sound in some cases.

Such hitting sound may not only be unpleasant on the ear of user but also be misunderstood to indicate occurrence of a trouble and, therefore, it gives rise to a problem of how to suppress occurrence of hitting sound.

To solve this problem, it may be thought to provide one of the lens frames with a rubber cushion so that the other lens frame may abut against this cushion to avoid any occurrence of hitting sound. However, if the cushion is provided, a space must be reserved in the barrel along its optical axis as much as a thickness of the cushion besides an optical axial stroke of the lens frame, to increase an optical axial size of the lens-barrel, which is disadvantageous in miniaturization of the lens-barrel.

In view of the above, the present invention has been developed, and it is an object of the present invention to provide a lens-barrel and an image pickup apparatus that can effectively suppress hitting sound by lens frames and also are advantageous in miniaturization of the lens-barrel.

In order to attain the above object, the present invention relates to a lens-barrel having an optical system, which is provided in a barrel, for directing an image of a subject to an image pickup device, the optical system including a first lens frame for holding a first lens and a second lens frame for holding a second lens, the first lens frame and the second lens frame being relatively movable respect to each other along an optical axis, characterized in that a flow path for generating air flow resistance when the air is released which is present between the first and second lens frames if these lens frames get close to each other is provided at a position where said first lens frame faces said second lens frame and a position where said second lens frame faces said first lens frame.

The present invention also relates to a lens-barrel having an optical system, which is provided in a barrel, for directing an image of a subject to an image pickup device, the optical system including a movable lens frame for holding a movable lens, the movable lens frame being movable along an optical axis thereof in a barrel body, characterized in that the movable lens frame has an outer periphery that surfaces an inner periphery surface of the barrel body, and a flow path for generating air flow resistance when the air is released which is present in the barrel body on a side toward which the movable lens frame is moved along the optical axis is provided between the inner periphery surface of the barrel body and the outer periphery of the movable lens frame.

Further, the present invention relates to an image pickup apparatus comprising a lens-barrel having an image pickup device provided in a barrel and an optical system for directing an image of a subject to the image pickup device in said barrel, the optical system including a first lens frame for holding a first lens and a second lens frame for holding a second lens, the first lens frame and the second lens frame being relatively movable respect to each other along an optical axis, characterized in that a flow path for generating air flow resistance when the air is released which is present between the first and second lens frames if these lens frames get close to each other is provided at a position where the first lens frame faces the second lens frame and a position where the second lens frame faces the first lens frame.

Additionally, the present invention relates to an image pickup apparatus comprising a lens-barrel having an image pickup device provided in a barrel and an optical system for directing an image of a subject to the image pickup device in the barrel, the optical system including a movable lens frame for holding a movable lens, the movable lens frame being movable along an optical axis thereof in a barrel body, characterized in that the variable lens frame has an outer periphery that faces an inner periphery surface of the barrel body, and a flow path for generating air flow resistance when the air is released which is present in the barrel body on a side toward which the movable lens frame is moved along the optical axis is provided between the inner periphery surface of the barrel body and the outer periphery of the movable lens frame.

According to the present invention, if one of a first lens frame and a second lens frame rapidly comes close to the other when, for example, a user rocks an image pickup apparatus in his hand, a speed of the lens frame slows down by the air flow resistance by the air flowing through the flow path. Accordingly, shock by the lens frames can be relaxed to suppress occurrence of hitting sound effectively, thereby advantageously preventing unpleasant sound from being given on the ear of the user and occurrence of a trouble from being misunderstood.

Further, in contrast to a case where a cushion to absorb shock is provided to the lens frame, it is unnecessary to reserve a space of a thickness of the cushion along the optical axis, which is advantageous in order to miniaturize the lens-barrel along the optical axial.

Figure 3:
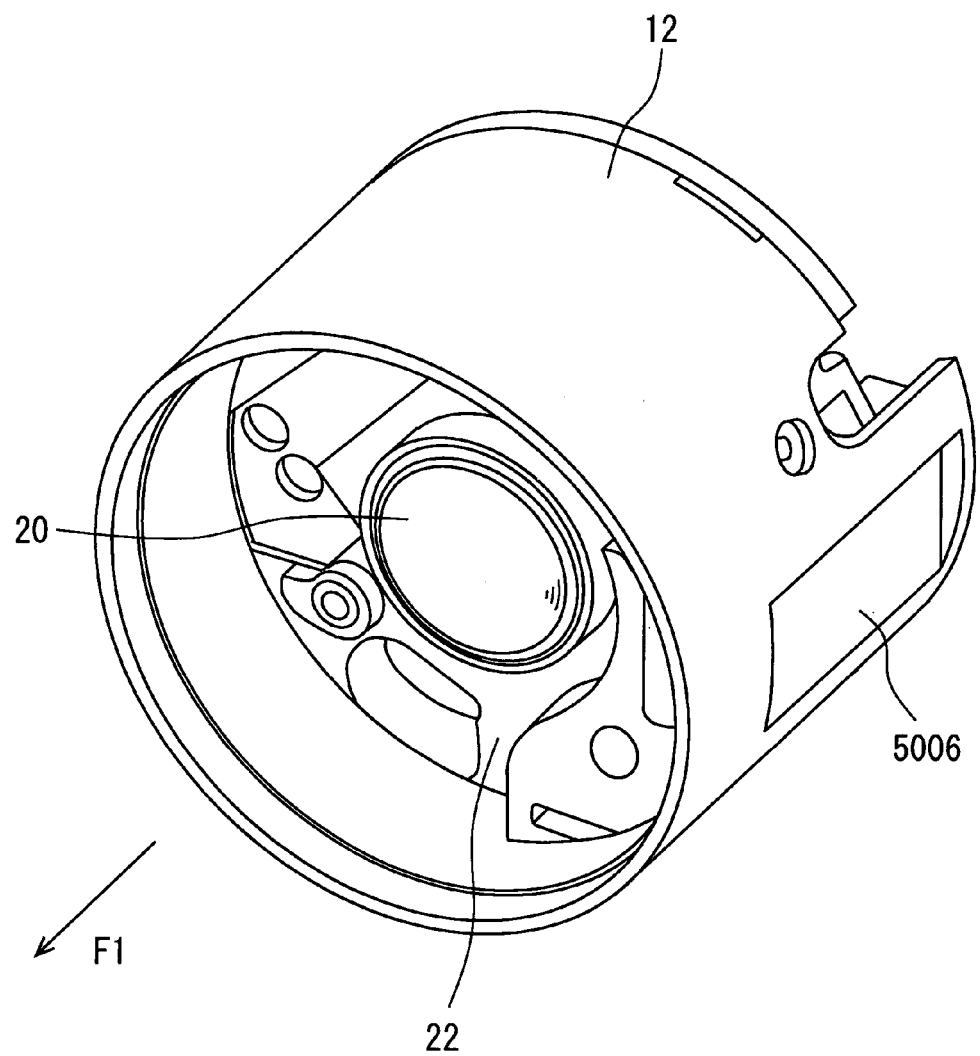

BRIEF DESCRIPTION OF THE DRAWINGS (FIG. 1) is a perspective view of an image pickup apparatus of a first embodiment;

(FIG. 2) is a block diagram for showing a configuration of the image pickup apparatus of the first embodiment;

(FIG. 3) is a perspective view of a lens-barrel for showing a part thereof;

(FIG. 4) is a cross-sectional view of FIG. 3;

(FIG. 5) is a perspective view of a movable lens frame, a drive mechanism, and a rear side fixed lens frame for showing configurations thereof;

(FIG. 6) is a perspective view of the movable lens frame, the drive mechanism, and the rear side fixed lens frame for showing the configurations thereof;

(FIG. 7) is a perspective view of the movable lens frame and the drive mechanism for showing configurations thereof;

(FIG. 8) is an explanatory diagram for showing a condition where the movable lens frame gets close to a first fixed lens frame;

(FIG. 9) is an explanatory diagram for showing a configuration of a flow path;

(FIG. 10) is an explanatory diagram for showing a condition where the movable lens frame has abutted against the first fixed lens frame;

(FIG. 11) is an explanatory diagram for showing a condition where the movable lens frame gets close to a second fixed lens frame;

(FIG. 12) is an explanatory diagram for showing a configuration of a flow path of a second embodiment;

(FIG. 13) is an explanatory diagram for showing the configuration of the flow path of the second embodiment;

(FIG. 14) is an explanatory diagram for showing a configuration of a flow path of a third embodiment; and (FIG. 15) is a cross-sectional view of a lens-barrel of a fourth embodiment.

BEST MODE FOR CARRYING OUT THE INVENTION

First Embodiment

The following will describe the first embodiment with reference to drawings.

Figure 2:
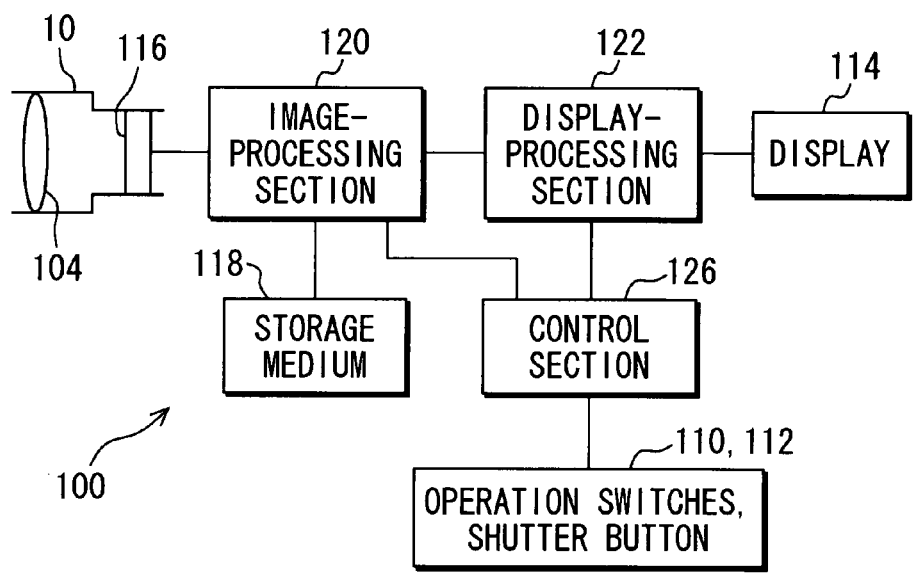

FIG. 1 is a perspective view of an image pickup apparatus of the first embodiment and FIG. 2 is a block diagram for showing a configuration of the image pickup apparatus of the first embodiment.

As shown in FIG. 1, an image pickup apparatus 100 of the first embodiment is a digital still camera and has a case 102 that constitutes an exterior thereof.

At a position near a front right portion of the case 102, a lens-barrel 10 is provided which contains and holds a photographing optical system 104 (which corresponds to an optical system of the claims).

The photographing optical system 104 is equipped with a plurality of lenses including an objective lens 1002 arranged nearest to the front side (toward a subject).

At a position near a front top of the case 102, a flash section 106 for emitting flashlight, an objective lens 108 of an optical finder, etc. are provided.

On a top end surface of the case 102, a shutter button 110 is provided, and on a rear surface of the case 102, an eyepiece window (not shown) of the optical finder, a plurality of operation switches 112 for performing various operations such as power turning-ON/OFF and switching between a photographing mode and a play-back mode, and a display 114 (see FIG. 2) on which a picked-up video is displayed are provided.

As shown in FIG. 2, behind the lens-barrel 10, an image pickup device 116 is arranged which is configured by a CMOS sensor and a CCD for picking up a subject's image formed by the photographing optical system 104; the image pickup apparatus 100 includes an image-processing section 120 for generating image data based on an imaging signal output from the image pickup device 116 and recording it in a storage medium 118 such as a memory card, a display-processing section 122 for displaying the image data on the display 114, and a control section 126 incorporating a CPU for controlling the image-processing section 120 and the display-processing section 122 in accordance with operations of the operation switches 112 and the shutter button 110.

It is to be noted that the control section 126 controls also movements of the movable lens frame 32 (see FIG. 4), which will be described later.

Next, the following will describe lens-barrel 10.

Figure 4:
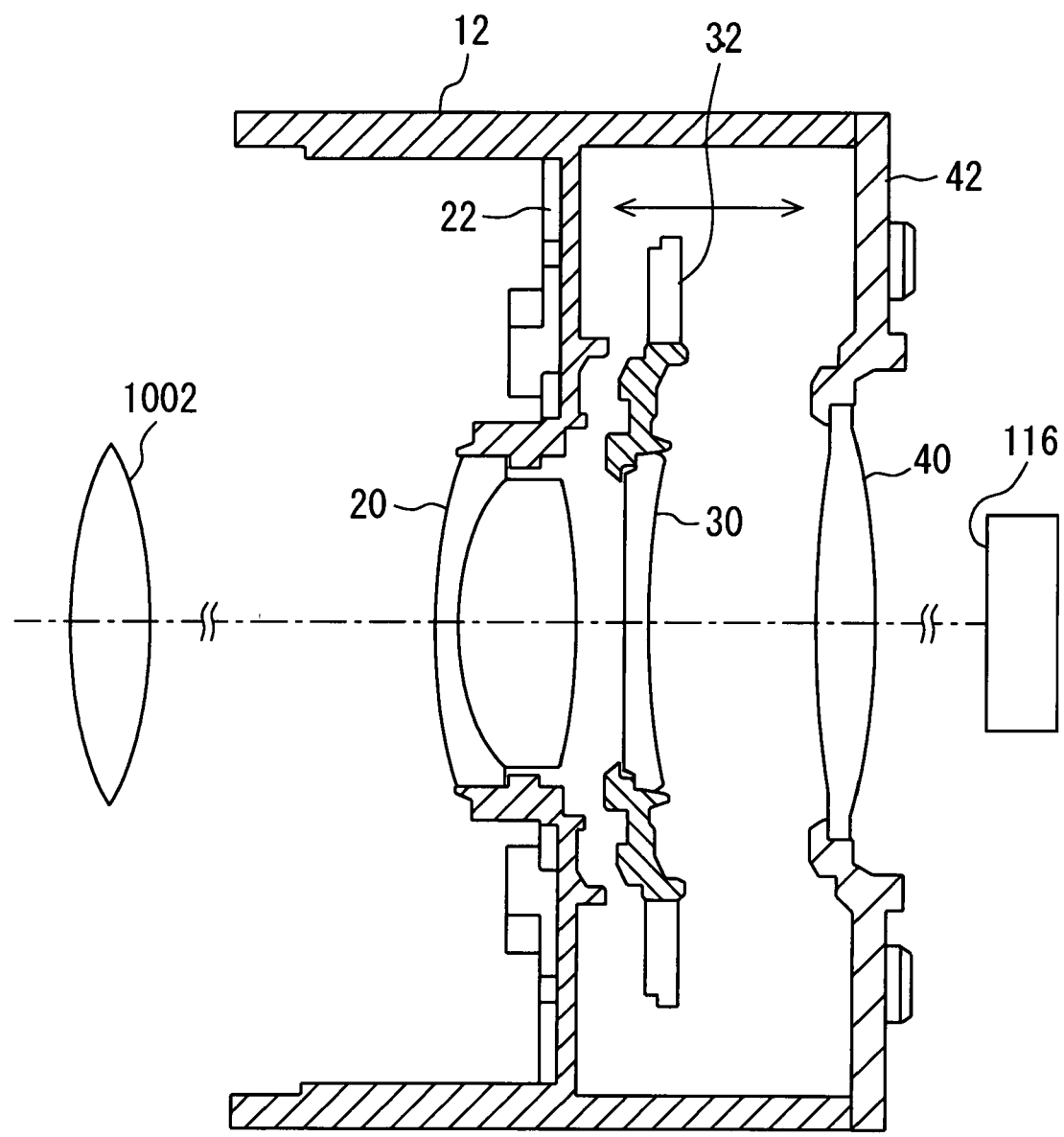
Figure 5:
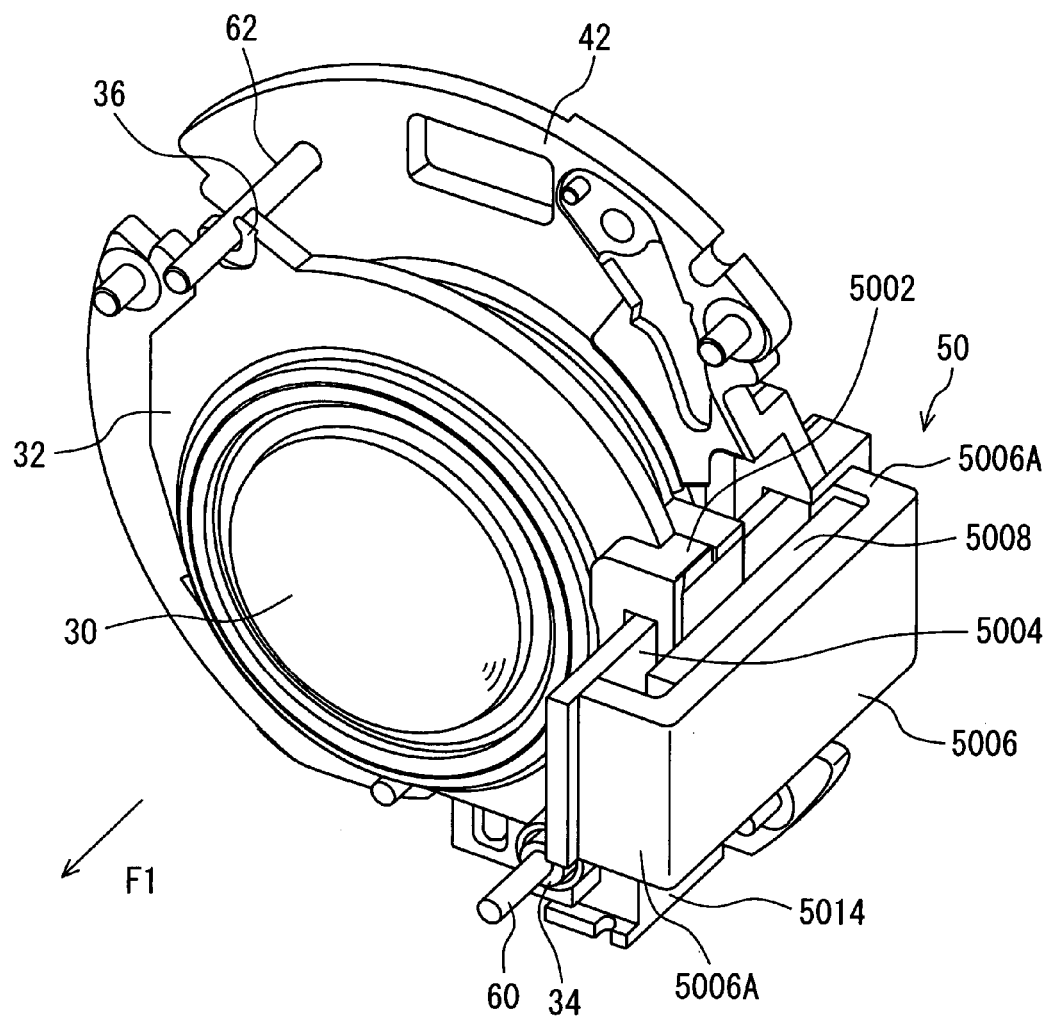
Figure 6:
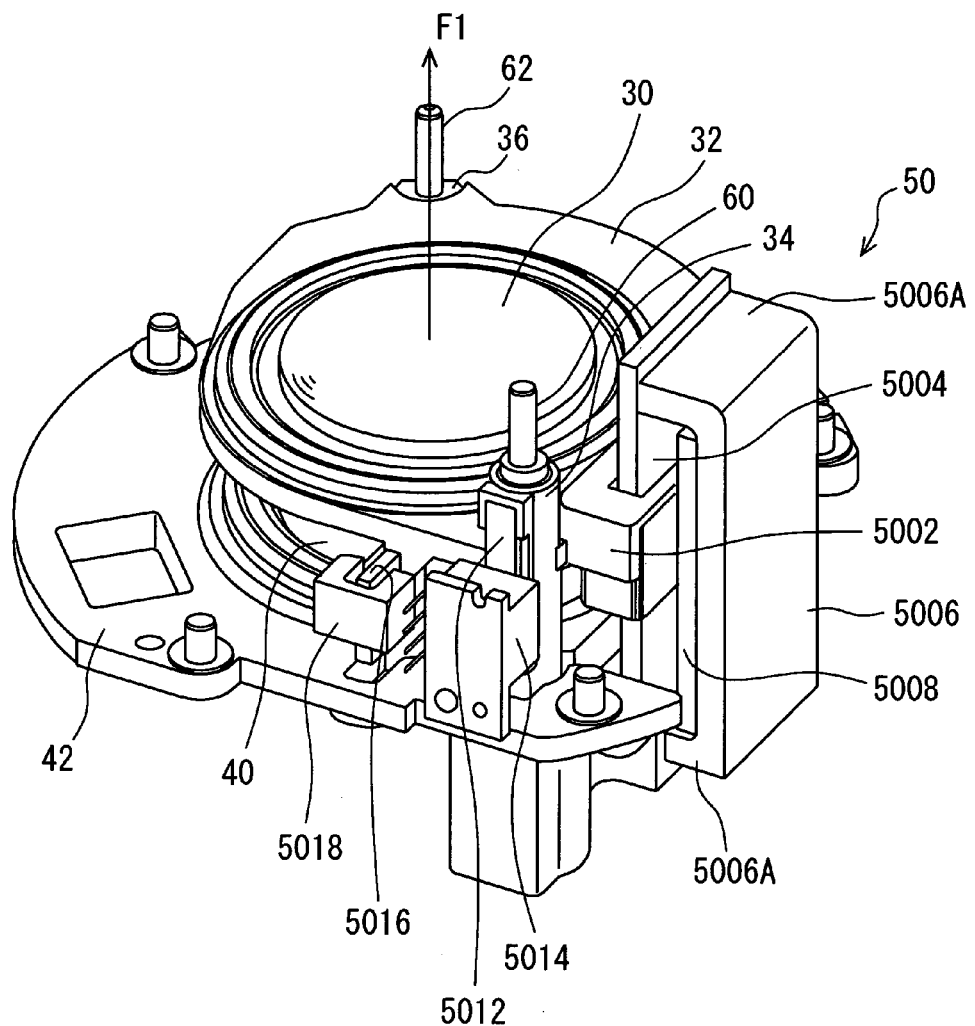
Figure 7:
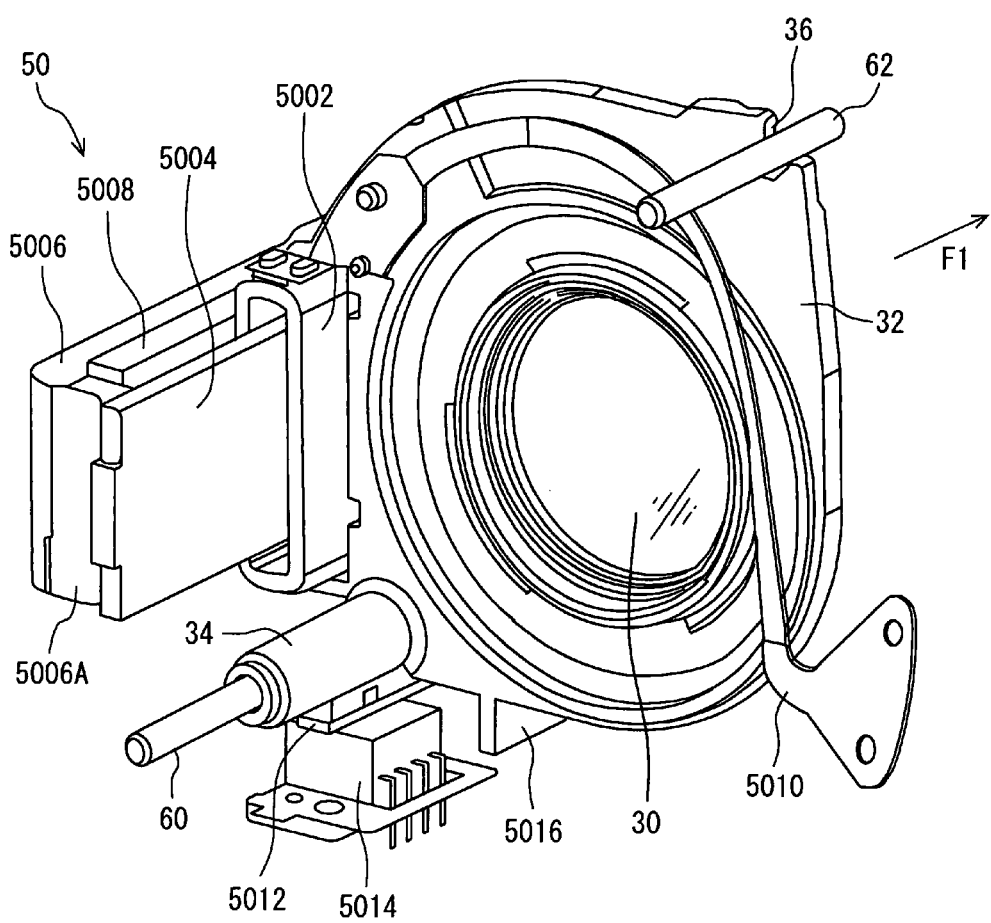

FIG. 3 is a perspective view of a lens-barrel 10 for showing a part thereof; FIG. 4 is a cross-sectional view of FIG. 3; FIGS. 5 and 6 are perspective views of a movable lens frame, a drive mechanism, and a rear side fixed lens frame for showing configurations thereof; and FIG. 7 is a perspective view of the movable lens frame and the drive mechanism for showing configurations thereof.

The lens-barrel 10 is configured by a barrel and a photographing optical system 104 incorporated in the barrel, in which barrel, as shown in FIGS. 3 and 4, a cylindrical-wall shaped movable collar 12 is incorporated as to be movable along an optical axis of the photographing optical system 104 (see FIG. 1).

In the movable collar 12, a first fixed lens 20, a movable lens 30, and a second fixed lens 40 are arranged along the optical axis in this order from the front side to the rear side in such a configuration that a flow path 70 (see FIG. 9) is provided between the first fixed lens 20 and the movable lens 30.

Further, between the movable lens 30 and the second fixed lens 40, a flow path 80 (see FIG. 11) is also provided.

It is to be noted that ahead of the first fixed lens 20, the objective lens 1002 is positioned, which is indicated by an arrow F1 in FIG. 3, while behind the second fixed lens 40, the image pickup device 116 is positioned.

Further, as shown in FIGS. 5 through 7, the movable collar 12 is equipped with a movable lens drive mechanism 50 for moving the movable lens 30 along the optical axis thereof.

It is to be noted that between the objective lens 1002 and the first fixed lens 20 and between the second fixed lens 40 and the image pickup device 116, a plurality of lenses are arranged respectively, which are not shown for simplicity of explanation.

On an inner periphery of the movable collar 12, at its optical axial midsection, the first fixed lens frame 22 is formed integrally with the movable collar 12, and the first fixed lens 20 is adhered to and held by the first fixed lens frame 22.

At an optical axial rear end of the movable collar 12, a second fixed lens frame 42 is integrally attached, and the second fixed lens 40 is adhered to and held by a second fixed lens frame 42.

The movable lens 30 is held by a movable lens frame 32.

On an outer periphery of the movable lens frame 32, a roller bearing section 34 and an engagement section 36 are provided which are set across the movable lens 30.

Inside the movable collar 12, a main guide shaft 60 and a sub-guide shaft 62 that extend along the optical axis are provided, opposite ends of each of the guide shafts are fixed to the first fixed lens frame 22 and the second fixed lens frame 42 by press fitting.

The main guide shaft 60 is inserted into the roller bearing section 34 and the sub-guide shaft 62 is engaged with the engagement section 36 so that the movable lens frame 32 cannot rotate around the optical axis but can move along the optical axis.

As shown in FIGS. 5 through 7, the movable lens drive mechanism 50 includes a coil 5002, an inside yoke 5004, an outside yoke 5006, a drive magnet 5008, etc.

The coil 5002 is adhesively attached to the outer periphery of the movable lens frame 32 and wound into an elongated rectangular frame shape around an axis line parallel to the optical axis.

The inside yoke 5004 is formed into a shape of a rectangular plate extending along the optical axis and passes through a center hole of the coil 5002 so that its longitudinal opposite ends can be fixed to the first fixed lens frame 22 and the second fixed lens frame 42 by press fitting as to be parallel to the optical axis.

The outside yoke 5006 is formed into a shape of a rectangular plate extending in parallel with the inside yoke 5004 outside the coil 5002 in such a configuration that erected walls 5006A erected in such a direction as to approach the inside yoke 5004 from longitudinal opposite ends thereof can be attached to the inside yoke 5004 at its longitudinal opposite ends thereof.

The drive magnet 5008 is appeared into a shape of a rectangular plate extending along the optical axis and is magnetically absorbed and fixed to a surface of the outside yoke 5006 between the two erected walls 5006A thereof. The drive magnet 5008 is configured so that its surface placed to one of its thickness directional positions acts as a north pole and its surface placed to the other position acts as a south pole.

It is to be noted that each of the erected walls 5006A of the outside yoke 5006 is attached to the inside yoke 5004 because each of these walls 5006A is magnetically absorbed to the inside yoke 5004.

Further, a winding of the coil 5002 is positioned to a gap formed between the inside yoke 5004 and the drive magnet 5008 in such a manner that it may not come into contact with the inside yoke 5004 and the drive magnet 5008.

Further, to the coil 5002, a flexible substrate 5010 is electrically connected which supplies a drive signal, so that the drive signal can be supplied to the coil 5002 via the flexible substrate 5010 from a drive circuit, not shown, which is controlled by the control section 126 shown in FIG. 2.

Further, on the outer periphery of the movable lens frame 32, an MR magnet 5012 is provided on which a magnetic scale is formed in such a manner that the north pole and the south pole may be alternated along the optical axis; at such a position of the movable collar 12 as to face this MR magnet 5012, an MR sensor 5014 is provided which contains a magnetic resistance element for detecting the magnetic scale of the MR magnet 5012 to detect an optical axial position of the movable lens frame 32 (movable lens 30) and supplying a position detection signal to the control section 126.

Further, on the outer periphery of the movable lens frame 32, a detection strip 5016 is externally provided in a protruding manner; at such a position of the movable collar 12 as to face this detection strip 5016, a photo-interrupter 5018 is provided which detects the detection strip 5016 to detect an optical axial reference position of the movable lens frame 32 (movable lens 30) and supplies a reference position detection signal to the control section 126.

Therefore, when the control section 126 controls the drive circuit, not shown, to supply the drive signal to the coil 5002, magnetic interaction occurs between a magnetic field generated by the coil 5002 and a magnetic field by a magnetic circuit configured by the inside yoke 5004, the outside yoke 5006, and the drive magnet 5008, so that optical axial frontward or rearward force is applied onto the coil 5002 to move the movable lens frame 32 frontward or rearward respectively.

The control section 126 controls the controls signal based on the reference position detection signal from a photo-interrupter 5018 and the position detection signal from the MR sensor 5014, thereby conducting servo control on an optical axial position of the movable lens frame 32.

The following will describe the flow path 70.

Figure 8:
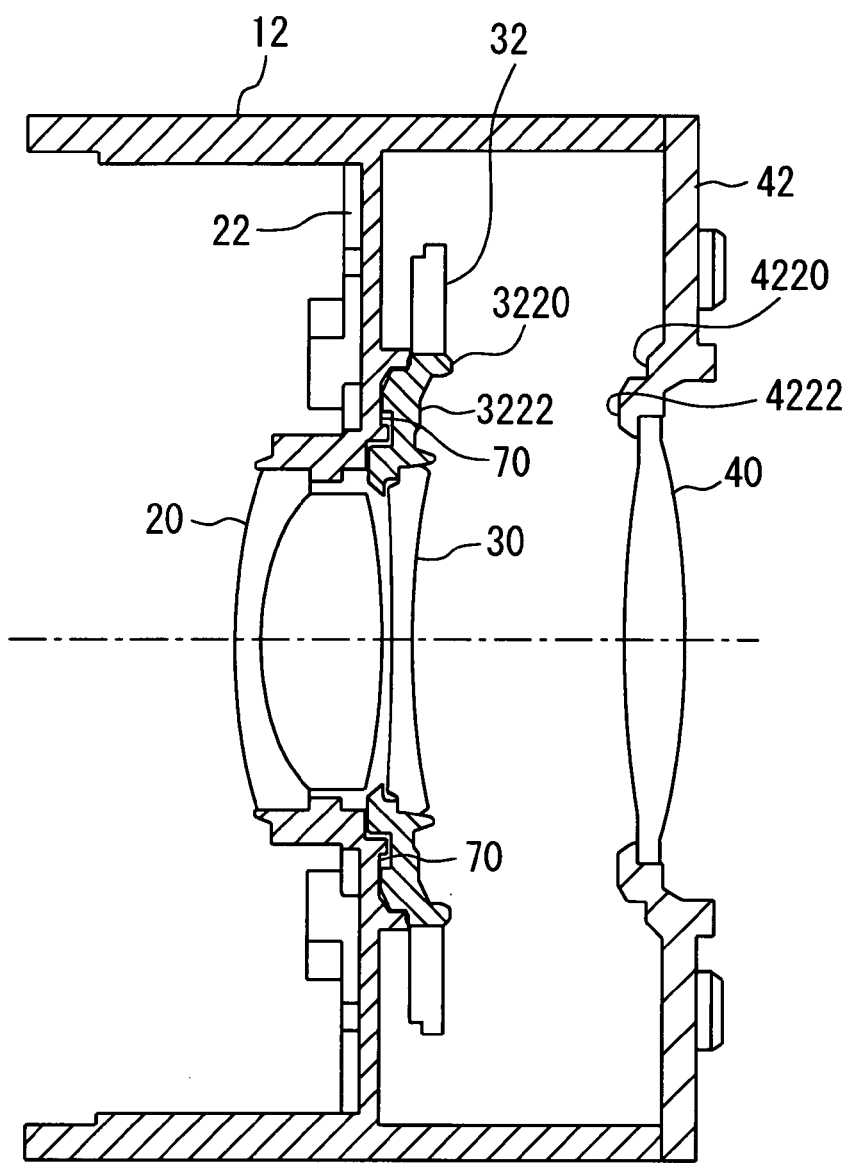
Figure 9:
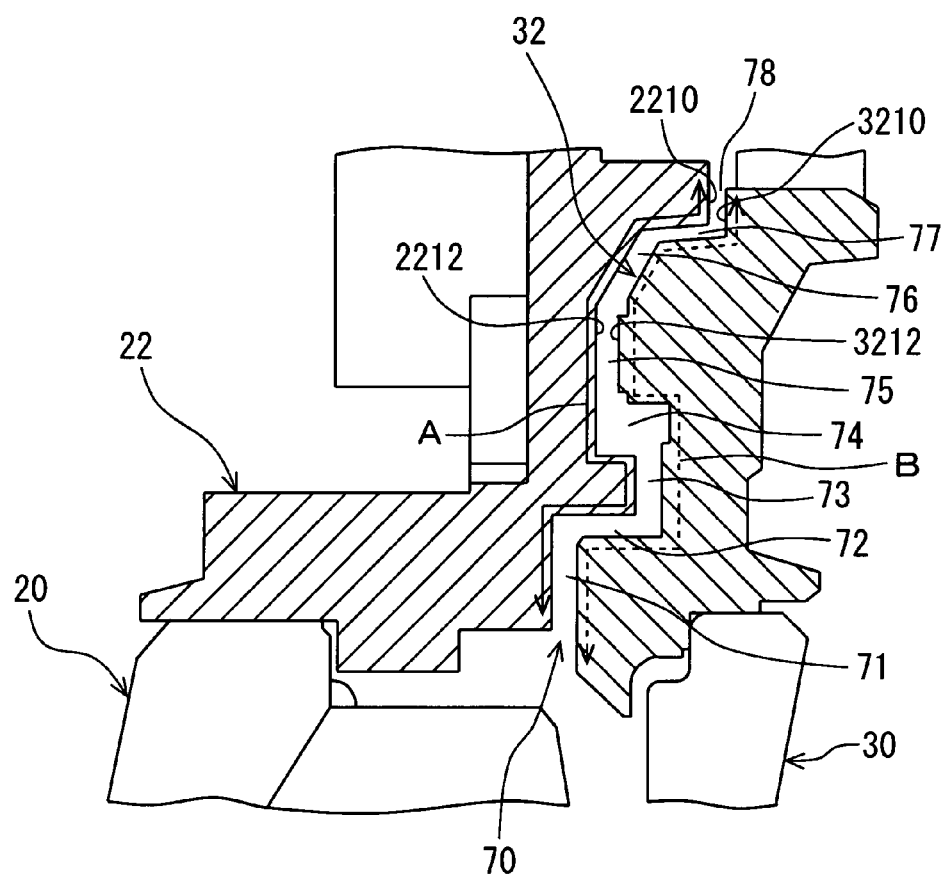
Figure 10:
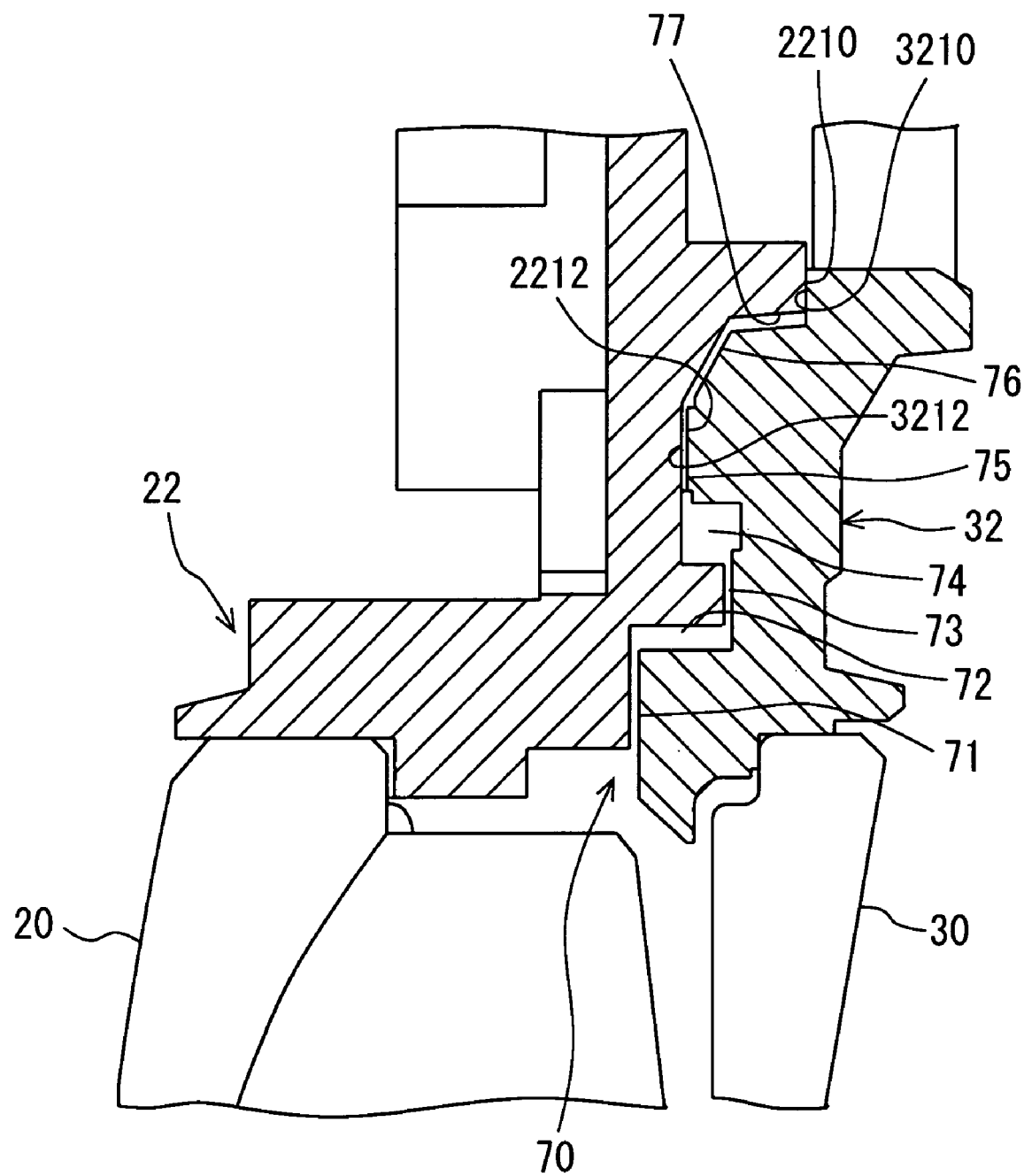
Figure 11:
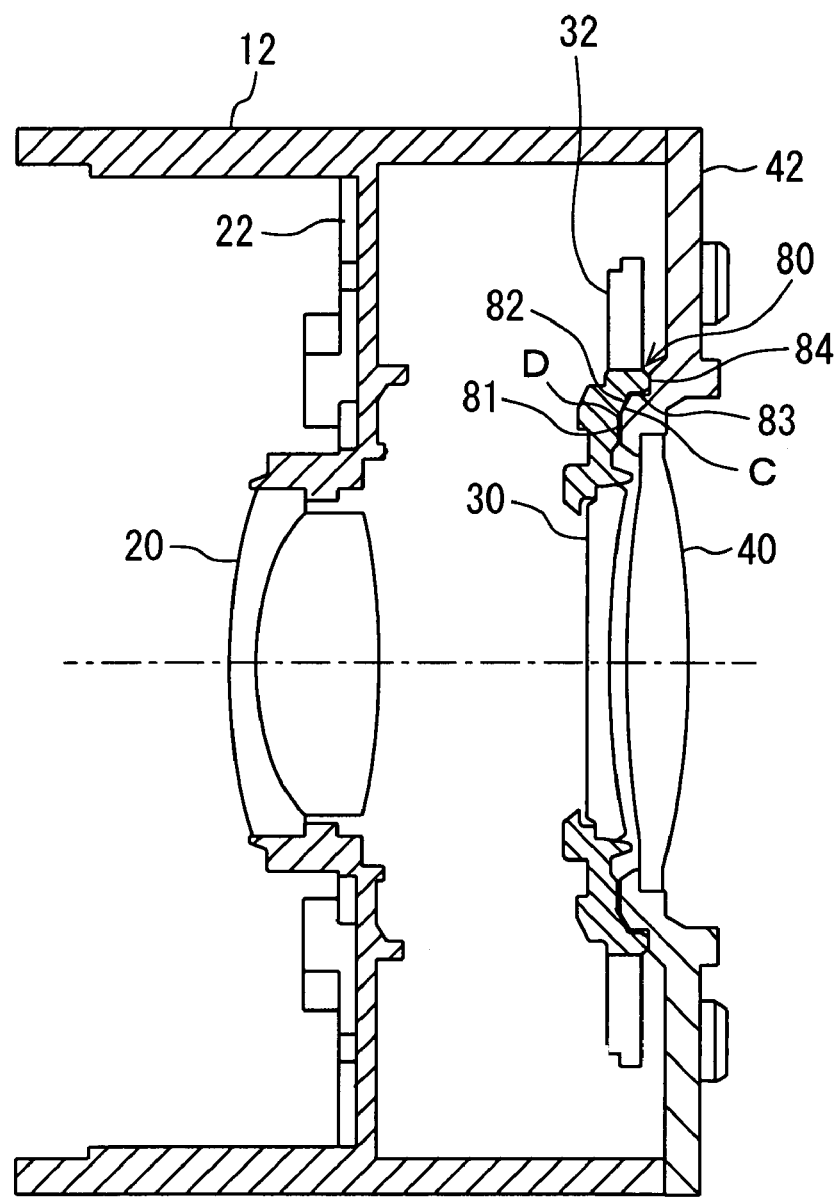

FIG. 8 is an explanatory diagram for showing a condition where the movable lens frame 32 gets close to the first fixed lens frame 22; FIG. 9 is an explanatory diagram for showing a configuration of the flow path 70; FIG. 10 is an explanatory diagram for showing a condition where the movable lens frame 32 has abutted against the first fixed lens frame 22; and FIG. 11 is an explanatory diagram for showing a condition where the movable lens frame 32 gets close to the second fixed lens frame 42.

As shown in FIG. 9, the flow path 70 is provided at a position A (range indicated by a solid line arrow) where the first fixed lens frame 22 faces the movable lens frame 32 and a position B (range indicated by a broken line arrow) where the movable lens 32 faces the first fixed lens frame 22 so as to generate air flow resistance when the air is released which is present between the movable lens frame 32 and the first fixed lens frame 22 if these lens frames get close to each other.

The first fixed lens frame 22 and the movable lens frame 32 are provided in such a manner also as to pass through the flow path 70 the air present between the first fixed lens 20 and the movable lens 30 when the first fixed lens frame 22 and the movable lens frame 32 get close to each other.

The flow path 70 extends around all the outer periphery of the first fixed lens 20 externally toward each of the radius direction of each of the first fixed lens 20 and the movable lens 30 with it being repeatedly traversed forward and backward along the optical axis of each of the first fixed lens 20 and the movable lens 30 at the position A where the first fixed lens frame 22 faces the movable lens frame 32 and the position B where the movable lens frame 32 faces the first fixed lens frame 22.

To describe it in more detail, the flow path 70 is constituted of first through eighth flow paths 71, 72, 73, 74, 75, 76, 77, and 78.

The first flow path 71 is formed at the position A where the first fixed lens frame 22 faces the movable lens frame 32 and the position B where the movable lens frame 32 faces the first fixed lens frame 22 so that it can extend around all the outer periphery of the first fixed lens 20 externally in a ring-plate shape toward the radius direction of each of the first fixed lens 20 and the movable lens 30.

The first flow path 71 is configured so that its cross section may gradually decrease as wall surfaces of the movable lens frame 32 and the first fixed lens frame 22 that constitute the first flow path 71 get close to each other. Therefore, it is also configured so that, as the wall surfaces of the movable lens frame 32 and the first fixed lens frame 22 get close to each other, the air passing through the first flow path 71 can speed up gradually so that the gradually-increasing-flow resistance can be generated.

The second flow path 72 is formed to extend in a cylindrical shape from an external radial end of the first flow path 71 toward the optical axis direction by as long as a preset minute dimension in the radius direction of each of the first fixed lens 20 and the movable lens 30 and configured so that a length of the flow path may gradually increase as the first fixed lens frame 22 and the movable lens frame 32 get close to each other.

As the second flow path 72 is formed when the first fixed lens frame 22 and the movable lens frame 32 get close to each other, the air passing through the second flow path 72 speeds up, thus rapidly increasing the flow resistance in the second flow path 72.

Once the second flow path 72 is formed, even if the first fixed lens frame 22 and the movable lens frame 32 get even closer to each other, the second flow path 72 is elongated but its cross section remains unchanged, so that a speed of the air passing through the second flow path 72 either changes little or increases slightly.

The third flow path 73 is formed so as to extend from a rear end of the second flow path 72 externally in the ring-plate shape along the radius direction.

Like the first flow path 71, the third flow path 73 is configured so as to generate the gradually-increasing flow resistance as the wall surfaces of the movable lens frame 32 and the first fixed lens frame 22 that constitute the third flow path 73 get close to each other.

The fourth flow path 74 is formed so as to extend forward along the optical axis in a cylindrical shape from an external radial end of the third flow path 73.

The fourth flow path 74, in the present embodiment, is formed so as to have a large cross section and does not contribute to the flow resistance.

The fifth flow path 75 is formed so as to extend externally toward the radius direction in a ring-plate shape from a front end of the fourth flow path 74.

The fifth flow path 75, like the first flow path 71 and the third flow path 73, is configured so as to generate the gradually-increasing-flow resistance as the wall surfaces of the movable lens frame 32 and the first fixed lens frame 22 that constitute the fifth flow path 75 get close to each other.

The sixth flow path 76 is formed so as to extend along the optical axis from a radial rear end of the fifth flow path 75 backward on a circular cone in an inclining manner so that cross section of its flow path may gradually decrease as the wall surfaces of the movable lens frame 32 and the first fixed lens frame 22 get close to each other.

The sixth flow path 76 has effects intermediate between the first and third flow paths 71 and 73 and the second flow path 72 and is configured so as to increase the air flow resistance not more rapidly than by the second flow path 72 but more rapidly than by the first and third flow paths 71 and 73 as the wall surfaces of the movable lens frame 32 and the first fixed lens frame 22 that constitute the sixth flow path 76 get close to each other.

The seventh flow path 77 is formed so as to extend in a cylindrical shape backward along the optical axis from a rear end of the sixth flow path 76.

The seventh flow path 77 is formed as to extend in a cylindrical shape along the optical axis by as long as a preset minute dimension in the radius direction of each of the first fixed lens 20 and the movable lens 30, so that like the second flow path 72, as the seventh flow path 77 is formed if the first fixed lens frame 22 and the movable lens frame 32 get close to each other, the air flow resistance increases rapidly, and once the seventh flow path 77 is formed, the air flow resistance changes little even if the flow path is elongated.

The eighth flow path 78 is formed so as to externally extend toward the radius direction in a ring-plate shape from a rear end of the seventh flow path 77.

Like the first flow path 71, the third flow path 73, and the fifth flow path 75, the eighth flow path 78 is configured so that its cross section may gradually decrease as the wall surfaces of the movable lens frame 32 and the first fixed lens frame 22 that constitute the eighth flow path 78 get close to each other, thereby generating the gradually-increasing-flow resistance.

In this configuration, a ring-plate shaped surface 2210 of the first fixed lens frame 22 that constitutes the eighth flow path 78 and a ring-plate shaped surface 3210 of the movable lens frame 32 that constitutes the eighth flow path 78 are formed as stopper surfaces that abut against each other when first fixed lens frame 22 and the movable lens frame 32 have got close to each other.

That is, the ring-plate shaped surfaces 2210 and 3210 serving as the stopper surfaces are provided at the outermost radial positions of the first fixed lens frame 22 and the movable lens frame 32 along the flow path 70, respectively.

Further, in the present embodiment, in a condition where the ring-plate shaped surfaces 2210 and 3210 serving as the stopper surfaces abut against each other, a ring-plate shaped surface 2212 of the first fixed lens frame 22 and a ring-plate shaped surface 3212 of the movable lens frame 32 that constitute the fifth flow path 75 are configured to face each other with an extremely small gap between them and the movable lens 30 and the first fixed lens 20 are configured to face each other with a larger gap between them than the extremely small gap.

It is to be noted that in the above embodiment, the first fixed lens 20 corresponds to a first lens and the movable lens 30 corresponds to a second lens in the claims.

Next, the following will describe operations of the flow path 70.

As shown in FIG. 8, when the movable lens frame 32 gets rapidly close to the first fixed lens frame 22, specifically, when the second flow path 72 and the seventh flow path 77 begin to be formed as shown in FIG. 9, the air present between the first fixed lens 20 and the movable lens 30 and the air present between the movable lens frame 32 and the first fixed lens frame 22 attempt to be released by passing through the flow path 70.

In this case, the air released by passing through the second flow path 72 and the air released by passing through the flow path 77 rapidly encounter any air flow resistance, thus giving rise to a pressure gradient in the flow path 70.

When the movable lens frame 32 further gets close to the first fixed lens frame 22 to bring closer to each other the wall surface that constitutes the first flow path 71, the wall surface that constitute the third flow path 73 and the fifth flow path 75, the wall surface that constitutes the sixth flow path 76, and the wall surface that constitutes the eighth flow path 78, the air flow resistance gradually increases in these flow paths 71, 73, 75, 76, and 78 and is added to the air flow resistance in the second flow path 72 and the seventh flow path 77, thereby further increasing the pressure gradient in the flow path 70.

If such a pressure gradient occurs in the flow path 70, an internal pressure between the movable lens frame 32 and the first fixed lens frame 22 rises to decrease a speed at which the movable lens 30 and the movable lens frame 32 get close to the first fixed lens 20 and the first fixed lens frame 22.

Then, when the movable lens 30 and the movable lens frame 32 have slowed down, as shown in FIG. 10, the surfaces 2210 and 3210 that constitute the stopper surfaces abut against each other moderately, thereby relaxing shock and preventing hitting sound from occurring.

According to the present embodiment, even if the movable lens frame 32 gets close to the first fixed lens frame 22 rapidly because the user rocks the image pickup apparatus 100 in his or her hand or rapidly changes its posture in a condition where power of the image pickup apparatus 100 is turned off and the coil of the drive mechanism 50 is not supplied with the drive signal, and the movable lens frame 32 can move freely, the movable lens 30 and the movable lens frame 32 slow down due to the air flow resistance of the air passing through the flow path 70. This enables shock by the first fixed lens frame 22 and the movable lens frame 32 to be relaxed to effectively suppress occurrence of the hitting sound, which advantageously prevents unpleasant sound from being given to the ear of the user and occurrence of a trouble from being misunderstood.

Further, a speed at which the movable lens frame 32 is moved by the drive mechanism 50 is extremely slower than the speed at which the movable lens frame 32 rapidly gets close to the first fixed lens frame 22 because the user rocks the image pickup apparatus 100 in his or her hand or rapidly changes its posture in a condition where the movable lens frame 32 can move freely. Accordingly, the air flow resistance of the air passing through the flow path 70 is almost negligible and has no adverse effects on control of the movement of the movable lens frame 32 (movable lens 30).

It is thus possible to surely prevent occurrence of hitting sound and also secure an optical axial movement stroke of the movable lens frame 32 (movable lens 30), thereby advantageously miniaturizing the lens-barrel 10 along its optical axis.

Further, although if the first fixed lens frame 32 is provided with a rubber cushion so that this movable lens frame 32 may abut against this cushion to avoid occurrence of hitting sound, a space must be reserved in the lens-barrel 10 along its optical axis by as much as a thickness of the rubber cushion, according to the present embodiment, it is unnecessary to take into account the thickness of such a cushion, which is advantageous in optical axial miniaturization of the lens-barrel 10.

Further, in the present embodiment, the surfaces 2210 and 3210 which constitute the stopper surfaces are provided at the outermost radial positions in the flow path 70, so that it is possible to increase the air flow resistance in the eighth flow path 78 immediately before the surfaces 2210 and 3210 abut against each other. Accordingly, the pressure gradient in the flow path 70 can be increased further to increase the internal pressure between the movable lens frame 32 and the first fixed lens frame 22 further, which is advantageous in further reduction of the speed at which the movable lens 30 and the movable lens frame 32 get close to the first fixed lens 20 and the first fixed lens frame 22.

Further, in the present embodiment, the surfaces 2210 and 3210 which constitute the stopper surfaces are provided along all circumference thereof in a circumference direction, thereby almost uniquely dispersing, in a circumferential direction, force encountered when the surfaces 2210 and 3210 abut against each other, so that it is possible to suppress force (moment) in a direction crossing the optical axis from acting on the movable lens frame 32, which is advantageous in surely preventing the roller bearing section 34 from biting the main guide shaft 60.

Further, according to this embodiment, in a condition where the ring-plate shaped surfaces 2210 and 3210 serving as the stopper surfaces abut against each other, a ring-plate shaped surface 2212 of the first fixed lens frame 22 and a ring-plate shaped surface 3212 of the movable lens frame 32 that constitute the fifth flow path 75 are configured to face each other with a small gap between them and the movable lens 30 and the fixed lens 20 are configured to face each other with a larger gap between them than the small gap.

Therefore, when the surfaces 2210 and 3210 which constitute the stopper surfaces abut against each other, even if the movable lens frame 32 is deformed in an optical axis direction, it is possible to prevent the surfaces 2212 and 3212 from abutting against each other so as to be interfered between a surface of the movable lens 30 and a surface of the first fixed lens 20. This is thus advantageous in miniaturization of the lens-barrel 10 in an optical axis direction thereof while surely preventing the interference between the movable lens 30 and the first fixed lens 20.

Further, in the present embodiment, the air flow resistance increases rapidly at the same time when the second flow path 72 and the seventh flow path 77 are formed, so that once the second flow path 72 and the seventh flow path 77 are formed, the air flow resistance is kept almost unchanged even if the first fixed lens frame 22 and the movable lens frame 32 get even closer to each other, thereby enabling the increased air flow resistance of the air passing through the flow path 70 to be kept.

Therefore, it is possible to continuously decrease the speeds of the movable lens 30 and the movable lens frame 32 over a relatively long stroke, which is advantageous in more surely decreasing the speeds of the movable lens 30 and the movable lens frame 32 to relax shock by the first fixed lens frame 22 and the movable lens frame 32 surely, thereby effectively suppressing occurrence of hitting sound.

Further, force F applied on the movable lens 30 and the movable lens frame 32 by pressure of the air present between the first fixed lens 20 and the first fixed lens frame 22 is equal to a product SP of an area S over which the movable lens 30 and the movable lens frame 32 are in contact with the air and a pressure P per unit area. In the present embodiment, internal pressure of the air increased between the first fixed lens 20 and the movable lens 30 acts on a large area formed by the first fixed lens 20 and the movable lens 30, so that it is possible to apply large force on the movable lens frame 32. This is advantageous in decreasing the speed at which the movable lens 30 and the movable lens frame 32 get close to the first fixed lens 20 and the first fixed lens frame 22.

The following will describe the flow path 80.

As shown in FIG. 11, the flow path 80 is provided at a position C where the second fixed lens frame 42 faces the movable lens frame 32 and a position D where the movable lens frame 32 faces the second fixed lens frame 42 so as to generate air flow resistance when the air is released which is present between them if these lens frames get close to each other.

The flow path 80 is provided in such a manner also as to pass through it the air sandwiched between the second fixed lens 40 and the movable lens 30 when the second fixed lens frame 42 and the movable lens frame 32 get close to each other.

The flow path 80 extends around all the outer periphery of the second fixed lens 40 externally toward each of the radius directions of the second fixed lens 40 and the movable lens 30 with it being repeatedly traversed forward and backward along the optical axis of each of the second fixed lens 40 and the movable lens 30 at the position C where the second fixed lens frame 42 faces the movable lens frame 32 and the position D where the movable lens frame 32 faces the second fixed lens frame 42.

To describe it in more detail, the flow path 80 is constituted of first through fourth flow paths 81, 82, 83, and 84, which are similar to the first through eighth flow paths 71, 72, 73, 74, 75, 76, 77, and 78 constituting the flow path 70 and will be so described simply.

The first flow path 81 is formed at the position C where the second fixed lens frame 42 faces the movable lens frame 32 and the position D where the movable lens frame 32 faces the second fixed lens frame 42 so that it can extend around all the outer periphery of the second fixed lens 40 externally in a ring-plate shape toward the radius direction of each of the second fixed lens 40 and the movable lens 30.

The first flow path 81 is configured as to generate any gradually-increasing-flow resistance as wall surfaces of the movable lens frame 32 and the second fixed lens frame 42 that constitute the first flow path 81 get close to each other.

The second flow path 82 is formed so as to extend along the optical axis from a radial rear end of the first flow path 81 backward on a circular cone in the inclining manner.

The second flow path 82 has the same functions as the above-described sixth flow path 76 and is configured as to increase the air flow resistance not more rapidly than by a third flow path 83, to be described later, but more rapidly than by the first flow path 81 as the wall surfaces of the movable lens frame 32 and the second fixed lens frame 42 that constitute the second flow path 82 get close to each other.

The third flow path 83 is formed as to extend in a cylindrical shape backward along the optical axis from a radial external end of the second flow path 82.

The third flow path 83 is formed so as to extend in a cylindrical shape along the optical axis by as long as a preset minute dimension in the radius direction of each of the second fixed lens 40 and the movable lens 30, so that as the third flow path 83 is formed if the second fixed lens frame 42 and the movable lens frame 32 get close to each other, a flow speed of the air passing through the third flow path 83 increases rapidly to thereby increase the air flow resistance rapidly, and once the third flow path 83 is formed, the air flow resistance changes little.

The fourth flow path 84 is formed so as to externally extend toward the radius direction in a ring-plate shape from a rear end of the third flow path 83.

Like the first flow path 81, the fourth flow path 84 is configured as to generate any gradually-increasing-flow resistance as the wall surfaces of the movable lens frame 32 the second fixed lens frame 42 that constitute the fourth flow path 84 get close to each other.

In this configuration, as shown in FIG. 11, a ring-plate shaped surface 4220 of the second fixed lens frame 42 that constitutes the fourth flow path 84 and a ring-plate shaped surface 3220 of the movable lens frame 32 that constitutes the fourth flow path 84 are formed as stopper surfaces that abut against each other when second fixed lens frame 42 and the movable lens frame 32 get close to each other.

That is, the ring-plate shaped surfaces 4220 and 3220 serving as the stopper surfaces are provided at the outermost radial positions of the second fixed lens frame 42 and the movable lens frame 32 along the flow path 80, respectively.

Further, in the present embodiment, in a condition where the ring-plate shaped surfaces 4220 and 3220 serving as the stopper surfaces abut against each other, a ring-plate shaped surface 4222 of the second fixed lens frame 42 and a ring-plate shaped surface 3222 of the movable lens frame 32 that constitute the first flow path 81 are configured to face each other with an extremely small gap between them and the movable lens 30 and the second fixed lens 40 are configured to face each other with a larger gap between them than the extremely small gap.

By providing such a flow path 80, a speed of the movable lens 30 and the movable lens frame 32 can be decreased to relax shock by the second fixed lens frame 42 and the movable lens frame 32 and effectively suppress occurrence of hitting sound, thereby giving the same actions and effects as those by the above-described flow path 70.

It is to be noted that in the above embodiment, the second fixed lens 40 corresponds to the first lens and the movable lens 30 corresponds to the second lens in the claims.

Second Embodiment

Figure 12:
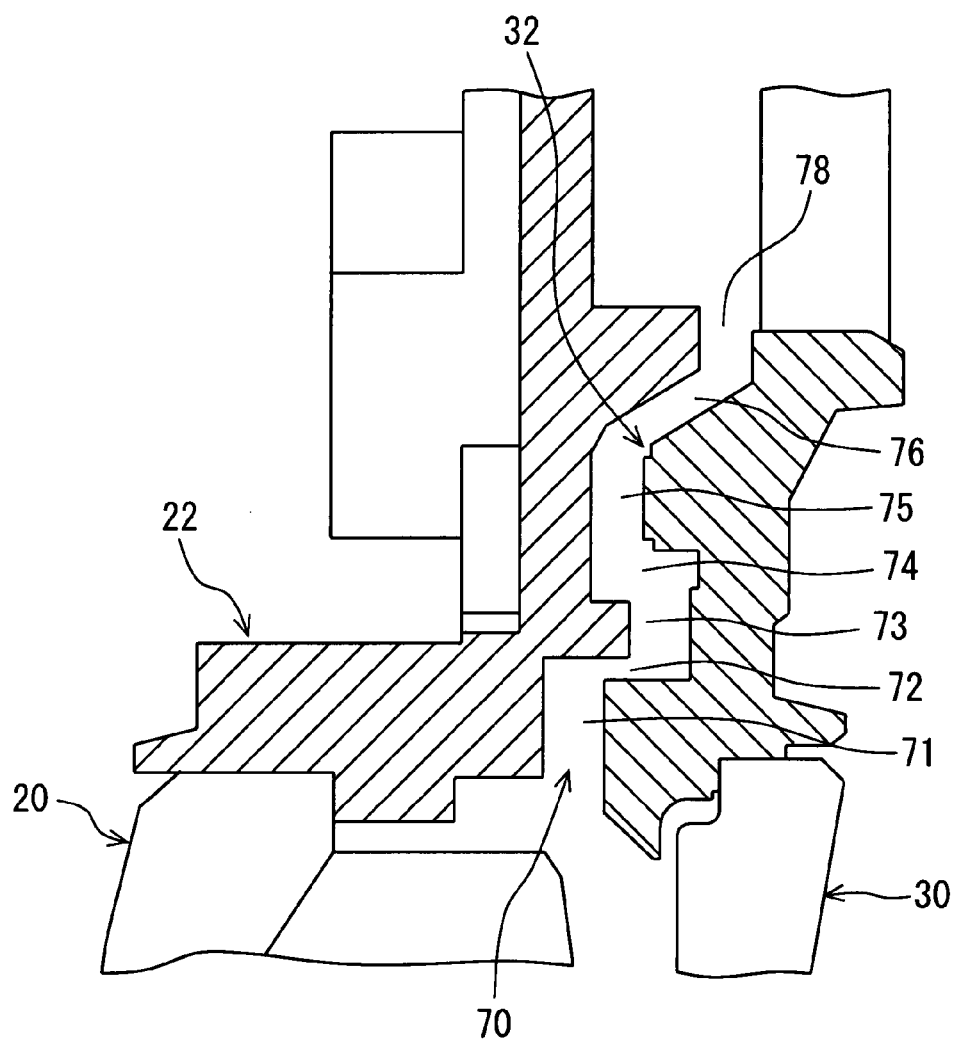
Figure 13:
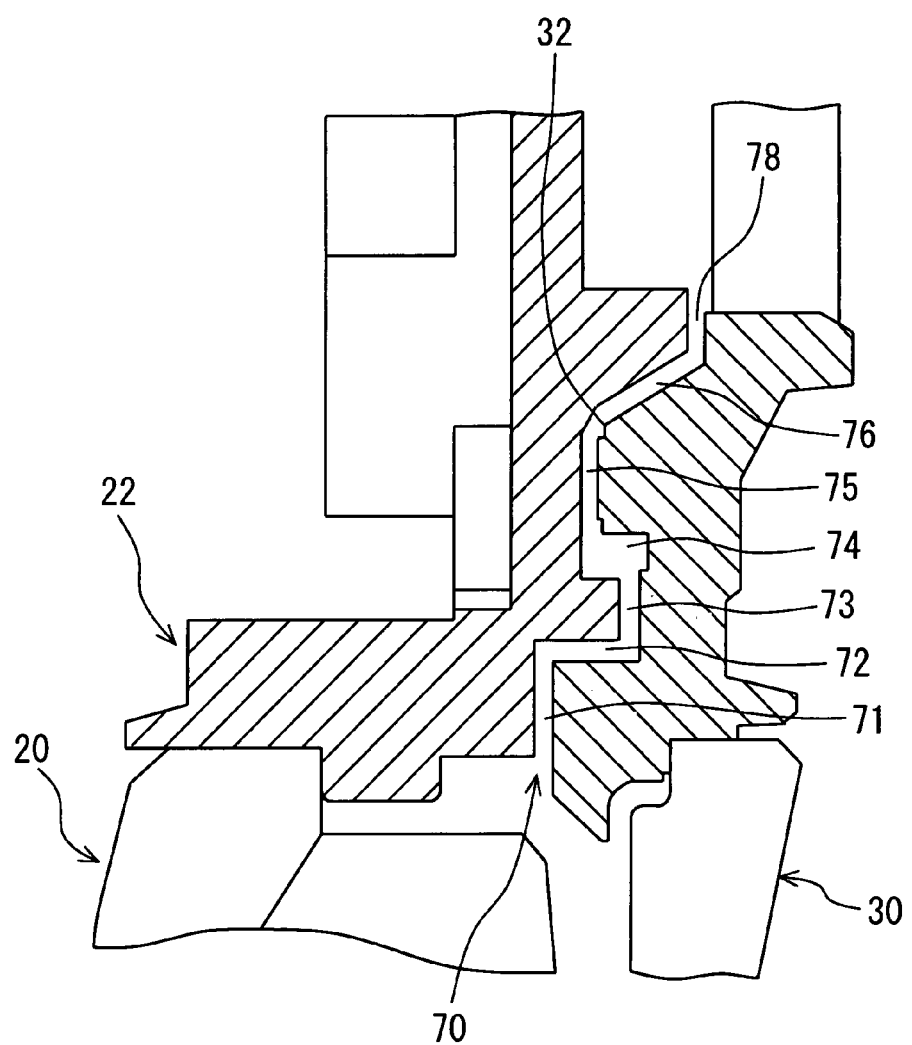

FIGS. 12 and 13 are explanatory diagrams for showing a configuration of the flow path 70 of the second embodiment.

In the second embodiment, a sixth flow path 76 of the flow path 70 is elongated more than that in the first embodiment and the seventh flow path 77 therein is omitted.

As shown in FIGS. 12 and 13, the sixth flow path 76 is formed so as to extend on a circular cone from the external radial end of the fifth flow path 75 backward along the optical axis in an inclining manner.

The sixth flow path 76 has effects intermediate between the first and third flow paths 71 and 73 and the second flow path 72 and is configured so as to increase any air flow resistance not more rapidly than by the second flow path 72 but more rapidly than by the first and third flow paths 71 and 73 as the wall surfaces of the movable lens frame 32 and the first fixed lens frame 22 that constitute the sixth flow path 76 get close to each other.

The second embodiment has omitted the seventh flow path 77 and left the sixth flow path 76 and, therefore, relaxes an increase in the air flow resistance as compared to the first embodiment in a case where the walls of the movable lens 32 and the first fixed lens frame 22 that constitute the flow path 70 get close to each other.

Third Embodiment

Figure 14:
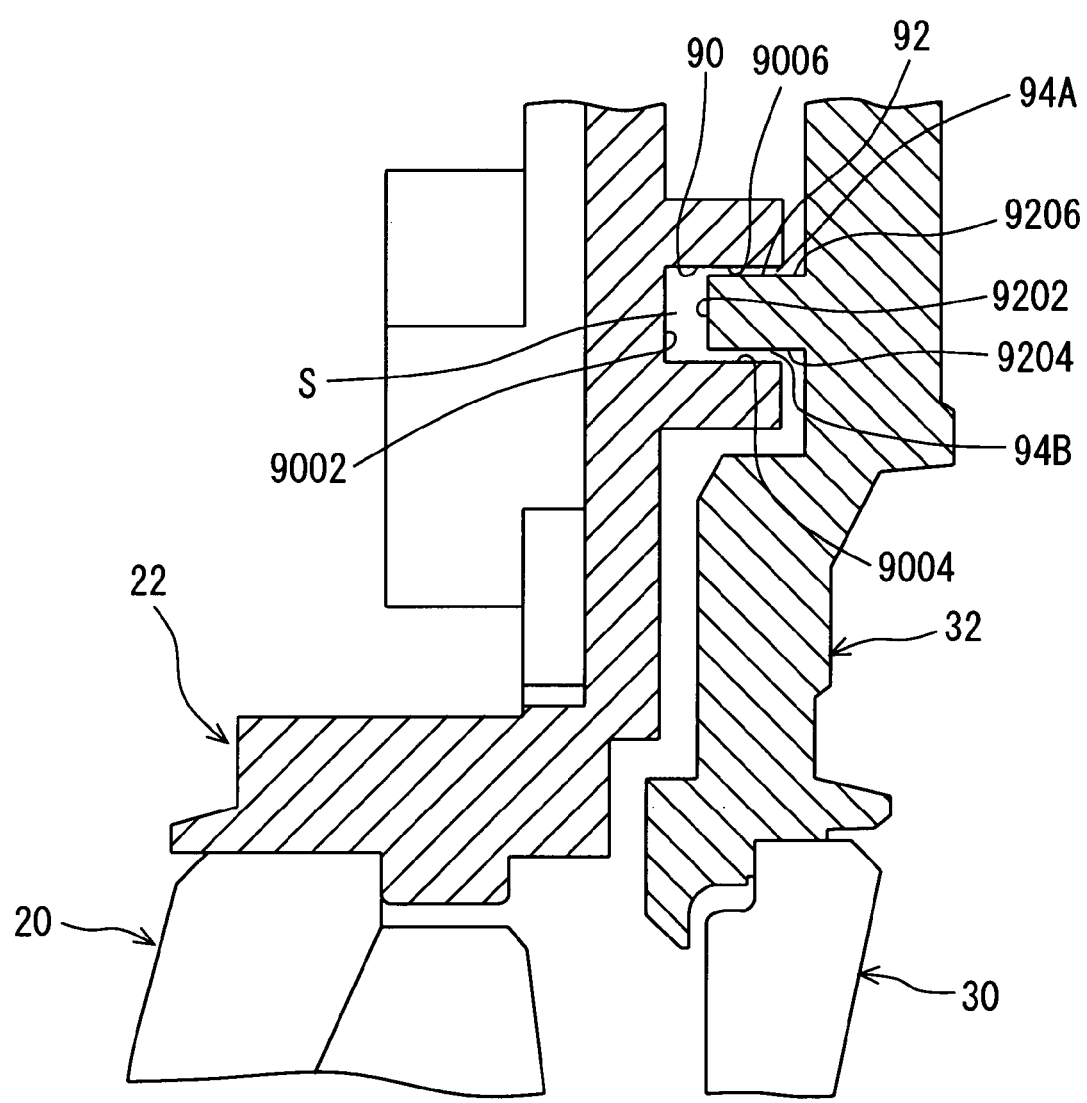

FIG. 14 is an explanatory diagram for showing a configuration of a flow path of the third embodiment.

In contrast to the first and second embodiments in which the flow path 70 has been formed over all the length from the outer peripheries of the first fixed lens 20 and the movable lens 30 to the external radial portions, in the third embodiment, a flow path is formed at a part of a position from the outer peripheries of the first fixed lens 20 and the movable lens 30 to the external radial portions.

At a position externally away in the radius direction from the outer periphery of the first fixed lens 20 of the first fixed lens frame 22, a ring-shaped concave portion 90 is formed around the optical axis of the first fixed lens 20 and has a ring-plate shaped bottom surface 9002 as well as a cylindrical inner side surface 9004 and a cylindrical outer side surface 9006 that are erected face-to-face from upper and lower sides of the bottom surface 9002, respectively.

On the other hand, at a position that faces the concave portion 90 in the movable lens frame 32, a ring-shaped protruding wall 92 which can be inserted into the concave portion 90 is formed and has an inner periphery surface 9204, an outer periphery surface 9206, and a top surface 9202.

When the movable lens 32 approaches the first fixed lens frame 22, the protruding wall 92 is inserted into the concave portion 90.

Then, the air is confined into a space S in the concave portion 90 by the bottom surface 9002 and the top surface 9202, so that a cylindrical gap is formed around the optical axis of each of the first fixed lens 20 and the movable lens 30 between the inner side surface 9004 and the inner periphery surface 9204. Another cylindrical gap is formed around the optical axis of each of the first fixed lens 20 and the movable lens 30 between the outer side surface 9006 and the outer periphery surface 9206. These gaps are set to have a predetermined dimension in radius direction of each of the first fixed lens 20 and the movable lens 30 and serve to form flow paths 94A and 94B.

Therefore, when the first fixed lens frame 22 and the movable lens frame 32 get close to each other to form the flow paths 94A and 94B, the air sandwiched between the bottom surface 9002 and the top surface 9202 in the concave portion 90 attempts to get out of the concave portion 90 through the flow paths 94A and 94B, in which case flow resistance occurs and rapidly increases but changes little once the flow paths 94A and 94B are formed.

That is, in the third embodiment, when the movable lens frame 32 approaches the first fixed lens frame 22 to insert the protruding wall 92 into the concave portion 90, the flow paths 94A and 94B are formed. The air confined into the space S between the bottom surface 9002 and the top surface 9202 attempts to get out of the space S through the flow paths 94A and 94B, in which case the flow resistance increases rapidly along the flow paths 94A and 94B, thereby increasing pressure gradient along the flow paths 94a and 94B.

Upon occurrence of the pressure gradient along the flow paths 94A and 94B, pressure in the space S rises to decreases a speed at which the movable lens 30 and the movable lens frame 32 get close to the first fixed lens 20 and the first fixed lens frame 22, thereby relaxing shock by them and preventing hitting sound from occurring.

Fourth Embodiment

Figure 15:
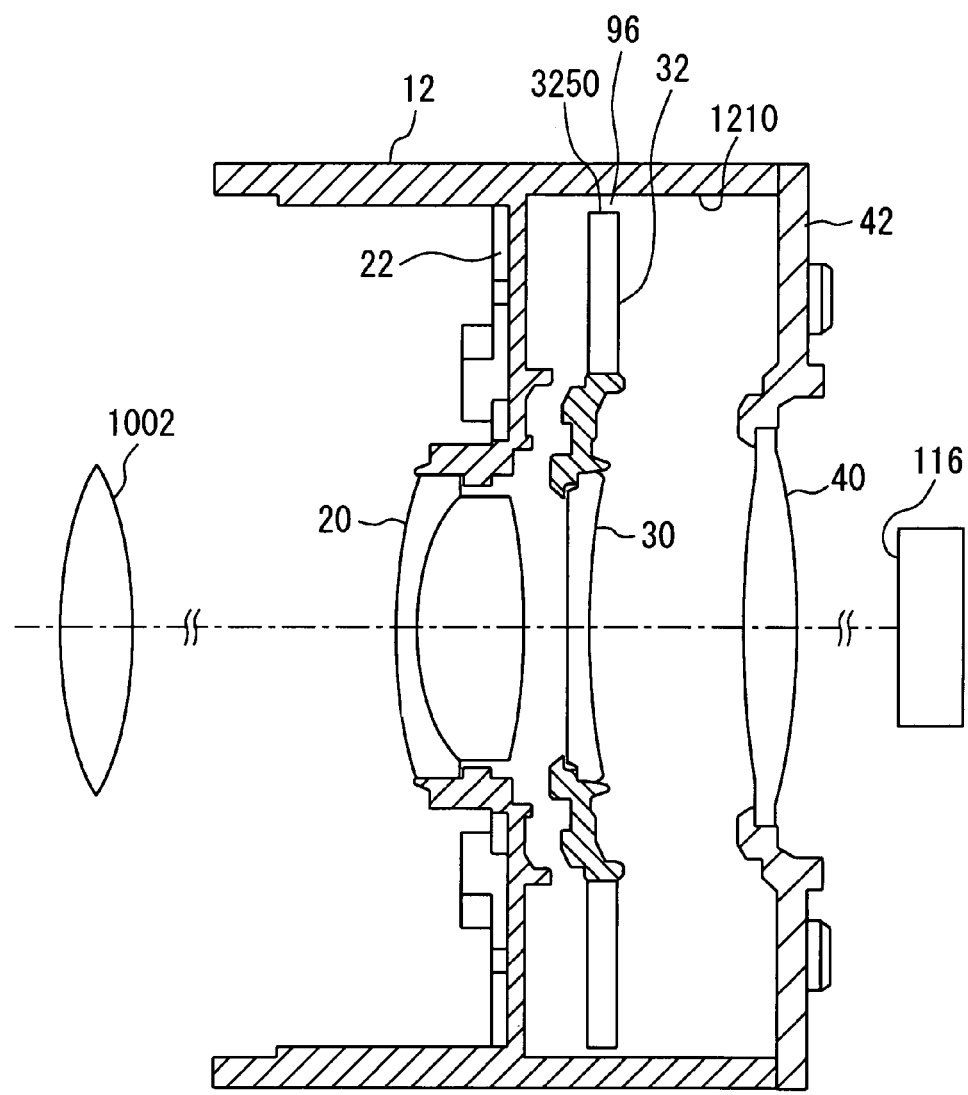

FIG. 15 is a cross-sectional view of a lens-barrel of the fourth embodiment.

In the fourth embodiment, a flow path 96 is formed between an outer periphery of the movable lens 32 positioned at a radial outermost portion of the movable lens 30 and an inner periphery surface 1210 of the movable collar 12.

That is, in the fourth embodiment, the movable lens 30 and the movable lens frame 32 are coupled to each other hermetically and so formed as if they constitute an integral member. When the movable lens 30 and the movable lens frame 32 move toward the first fixed lens 20 and the first fixed lens frame 22, the air is confined between the movable lens 30 and the movable lens frame 32 and the first fixed lens 20 and the first fixed lens frame 22. Further, when the movable lens 30 and the movable lens frame 32 move toward the second fixed lens 40 and the second fixed lens frame 42, the air is confined between the movable lens 30 and the movable lens frame 32 and the second fixed lens 40 and the second fixed lens frame 42. Then, an outer periphery surface 3250 that faces an inner periphery surface 1210 of the movable collar 12 is formed on the outer periphery of the movable lens frame 32.

A gap between the inner periphery surface 1210 and the outer periphery surface 3250 is set to have such a dimension that air flow resistance may occur if the movable lens frame 32 moves rapidly (speedily) because the image pickup apparatus 100 is rocked in a condition where the coil in the drive mechanism 50 is not supplied with the drive signal and the movable lens frame 32 can move freely and that no flow resistance may occur for smooth movement when the movable lens frame b32 is moved by the drive mechanism 50.

According to such a fourth embodiment also, a speed at which the movable lens frame 32 gets close to the first fixed lens 20 and the second fixed lens frame 42 is decreased to relax shock by them, thereby preventing hitting sound from being produced.

Although the present embodiments have been described by using a digital still camera as the image pickup apparatus, the present invention can be applied also to a video camera and any other various kinds of image pickup apparatuses.

The invention claimed is:

1. A lens-barrel having an optical system, which is provided in a barrel, for directing an image of a subject to an image pickup device, said optical system including a first lens frame for holding a first lens and a second lens frame for holding a second lens, said first lens frame and said second lens frame being relatively movable with respect to each other along an optical axis, characterized in that:
    a flow path for generating air flow resistance when the air is released which is present between the first and second lens frames if these lens frames get close to each other is provided at a position where said first lens frame faces said second lens frame and a position where said second lens frame faces said first lens frame,
    wherein said flow path externally extends in a radial direction of any one of said first lens and said second lens from the outer peripheries of said first and second lenses at the position where said first lens frame faces said second lens frame and the position where said second lens frame faces said first lens frame; and
    a wall surface of said first lens frame and a wall surface of said second lens frame that constitute said flow path at a portion which is set at an outermost position in said radial direction in said flow path are formed as stopper surfaces that abut moderately against each other.

2. The lens-barrel according claim 1, characterized in that said flow path externally extends in a radial direction of any one of said first lens and said second lens all over the outer peripheries of said first and second lenses at the position where said first lens frame faces said second lens frame and the position where said second lens frame faces said first lens frame.

3. The lens-barrel according claim 1, characterized in that said first lens frame and said second lens frame are provided so that the air present between said first and second lenses may also be released to the flow path when said first and second lens frames get close to each other.

4. The lens-barrel according claim 1, characterized in that said flow path externally extends toward the radial directions of said first lens and said second lens with it being repeatedly traversed forward and backward along an optical axis of any one of said first and second lenses at the position where said first lens frame faces said second lens frame and the position where said second lens frame faces said first lens frame.

5. The lens-barrel according claim 1, characterized in that said flow path externally extends in a radial direction of any one of said first lens and said second lens from all the outer peripheries of said first and second lenses with it being repeatedly traversed forward and backward along an optical axis of any one of said first and second lenses at the position where said first lens frame faces said second lens frame and the position where said second lens frame faces said first lens frame.

6. The lens-barrel according claim 1, characterized in that said flow path is configured as to contain a cylindrical gap that cylindrically extends around any one of the optical axes of said first and second lenses and whose path length gradually increases as said first and second lens frames get close to each other.

7. The lens-barrel according claim 1, characterized in that said flow path is configured as to contain a ring-plate shaped gap around an optical axis of any one of said first and second lenses, said gap extending in a plane orthogonal to said optical axis and in which a cross section of the flow path gradually decreases as said first and second lens frames get close to each other.

8. The lens-barrel according claim 1, characterized in that said flow path is configured as to contain a cylindrical gap that extends on a circular cone around an optical axis of any one of said first and second lenses and in which cross section of the flow path gradually decrease as said first and second lens frames get close to each other.

9. A lens-barrel having an optical system, which is provided in a barrel, for directing an image of a subject to an image pickup device, said optical system including a movable lens frame for holding a movable lens, said movable lens frame being movable along an optical axis thereof in a barrel body, said optical system further including a first lens frame for holding a first lens and a second lens frame for holding a second lens, said first lens frame and said second lens frame being relatively movable with respect to each other along an optical axis, characterized in that:

said movable lens frame has an outer periphery that faces an inner periphery surface of said barrel body; and a flow path for generating air flow resistance when the air is released which is present in said barrel body on a side toward which said movable lens frame is moved along the optical axis is provided between the inner periphery surface of said barrel body and said outer periphery of the movable lens frame, wherein said flow path externally extends in a radial direction of any one of said first lens and said second lens from the outer peripheries of said first and second lenses at the position where said first lens frame faces said second lens frame and the position where said second lens frame faces said first lens frame; and a wall surface of said first lens frame and a wall surface of said second lens frame that constitute said flow path at a portion which is set at an outermost position in said radial direction in said flow path are formed as stopper surfaces that abut moderately against each other.

10. An image pickup apparatus comprising a lens-barrel having an image pickup device provided in a barrel and an optical system for directing an image of a subject to the image pickup device in said barrel, said optical system including a first lens frame for holding a first lens and a second lens frame for holding a second lens, said first lens frame and said second lens frame being relatively movable with respect to each other along an optical axis, characterized in that:

a flow path for generating air flow resistance when the air is released which is present between the first and second lens frames if these lens frames get close to each other is provided at a position where said first lens frame faces said second lens frame and a position where said second lens frame faces said first lens frame, wherein said flow path externally extends in a radial direction of any one of said first lens and said second lens from the outer peripheries of said first and second lenses at the position where said first lens frame faces said second lens frame and the position where said second lens frame faces said first lens frame; and a wall surface of said first lens frame and a wall surface of said second lens frame that constitute said flow path at a portion which is set at an outermost position in said radial direction in said flow path are formed as stopper surfaces that abut moderately against each other.

11. An image pickup apparatus comprising a lens-barrel having an image pickup device provided in a barrel and an optical system for directing an image of a subject to the image pickup device in said barrel, said optical system including a movable lens frame for holding a movable lens, said movable lens frame being movable along an optical axis thereof in a barrel body, said optical system further including a first lens frame for holding a first lens and a second lens frame for holding a second lens, said first lens frame and said second lens frame being relatively movable with respect to each other along an optical axis, characterized in that:

said movable lens frame has an outer periphery that faces an inner periphery surface of said barrel body; and a flow path for generating air flow resistance when the air is released which is present in said barrel body on a side toward which said movable lens frame is moved along the optical axis is provided between the inner periphery surface of said barrel body and said outer periphery of the movable lens frame, wherein said flow path externally extends in a radial direction of any one of said first lens and said second lens from the outer peripheries of said first and second lenses at the position where said first lens frame faces said second lens frame and the position where said second lens frame faces said first lens frame; and a wall surface of said first lens frame and a wall surface of said second lens frame that constitute said flow path at a portion which is set at an outermost position in said radial direction in said flow path are formed as stopper surfaces that abut moderately against each other.

* * * * *